United States Patent [19]
Rowe et al.

[11] Patent Number: 5,522,134
[45] Date of Patent: Jun. 4, 1996

[54] TURBINE VANE FLOW AREA RESTORATION METHOD

[75] Inventors: Jon G. Rowe, Middletown; Norman Pietruska, Durham; Richard J. Pawlaczyk, Hartford; Gilbert B. Wilcox, Somers, all of Conn.

[73] Assignee: United Technologies Corporation, Hartford, Conn.

[21] Appl. No.: 270,700

[22] Filed: Jun. 30, 1994

[51] Int. Cl.$^6$ ..................................................... B23P 15/00
[52] U.S. Cl. .................. 29/889.1; 29/402.08; 29/402.13
[58] Field of Search ............................ 29/889.1, 402.08, 29/402.09, 402.13, 402.16, 402.19, 402.14, 402.21

[56] References Cited

U.S. PATENT DOCUMENTS

| | | | |
|---|---|---|---|
| 4,832,252 | 5/1989 | Fraser | 29/889.1 |
| 5,033,938 | 7/1991 | Fraser et al. | 29/889.1 |
| 5,156,321 | 10/1992 | Liburdi et al. | 29/889.1 |
| 5,253,978 | 10/1993 | Fraser | 29/889.1 |
| 5,351,395 | 10/1994 | Crawmer et al. | 29/889.1 |

*Primary Examiner*—Irene Cuda
*Attorney, Agent, or Firm*—Barry L. Kelmachter

[57] ABSTRACT

A method for refurbishing or restoring a turbine vane or other airfoil to restore a desired flow area includes the steps of: providing a plate to be used to restore the flow area on the airfoil; cutting the plate into a desired shape; machining a series of tapers into the cut plate so that the cut plate has a single region with a substantially uniform thickness; overlaying a surface of the airfoil with the pre-cut, pre-shaped plate so that the substantially uniform thickness region is positioned over that part of the airfoil where the flow area is to be restored; and attaching the pre-cut, pre-shaped plate to the airfoil. The refurbishment or restoration method further includes heat treating the pre-cut, pre-shaped plate so that the plate softens and conforms to the shape of the airfoil surface.

16 Claims, 2 Drawing Sheets

TURBINE VANE FLOW AREA RESTORATION METHOD

BACKGROUND ART

The present invention relates to an improved method for refurbishing an airfoil, such as a vane for a gas turbine engine, to restore a desired flow area.

A gas turbine engine includes a compressor section, a combustion section, and a turbine section. Disposed within the turbine section are alternating rows of rotatable blades and static vanes. As hot combustion gases pass through the turbine section, the blades are rotatably driven, turning a shaft and thereby providing shaft work for driving the compressor section and other auxiliary systems. The higher the gas temperature, the more work that can be extracted in the turbine section and the greater the overall efficiency. In order to increase the turbine section operating temperature capability, cobalt and nickel base superalloy materials are used to produce the turbine airfoil blades and vanes. Such materials maintain mechanical strength at high temperatures.

The static vanes, disposed between the rows of rotating blades, stabilize and direct the gas flow from one row of rotating turbine blades to the next row, with a nozzle area defined by the spacing between the adjacent vanes. Such gas flow stabilization optimizes the amount of work extracted in the turbine section. Generally, the nozzle flow area is assigned a series of classification numbers which are correlated to the volumetric gas flow. This allows comparison of flow properties between vanes of complex geometry. The nozzle area is therefore defined for convenience in terms of a class size. For example, in a particular model engine, a class 27 nozzle has an open area of 1.868–1.894 square inches, while a class 29 nozzle has an open area of 1.919–1.944 square inches, regardless of geometry.

In service, deterioration of the vane surface(s) occurs due to oxidation and metal erosion caused by abrasives and corrosives in the flowing gas stream impinging on the vane. In addition, high gas loadings at high temperature promote distortion of the vanes, thereby enlarging the nozzle area, with a consequent loss in turbine efficiency. During a periodic engine overhaul, the vanes are inspected for physical damage and evaluated to determine the degree of flow area change and the effect on nozzle classification. Before such vanes can be returned to the engine, any eroded material must be replaced and the vanes otherwise reclassified. In addition, any vanes which suffer a loss of metal or a change in shape due to coating removal or repair must be reclassified.

Several methods exist for modifying a vane to return the nozzle gas flow area to the original classification (reclassifying). One method involves hot striking or otherwise bending the trailing edge of the vane, narrowing the gap between adjacent vanes. However, such bending introduces stresses which may produce cracks in the vane. Such bending may also cause excessive distortion of the vane, preventing the proper fit and seal of the internal cooling tubes, while the fixturing devices, which hold the vanes during bending, may distort the vane platform or crush the vane pedestal. Even if bending stresses can be reduced, several high temperature alloys used in gas turbine engines cannot be hot formed or bent due to the deleterious effects on material properties such as fatigue strength. Since the bending process does not return metal to the vane surface, there is no strength contribution and the vane is structurally weaker than a new vane would be, limiting the useful life of the vane.

Another method for reclassifying turbine vanes involves the addition of an alloy to the deteriorated vane surface by a combined weld/plasma spray process, such as that described in U.S. Pat. No. 4,028,787 to Cretella et al. This process requires the addition of weld beads to the worn surface for reinforcement, with a number of plasma sprayed layers of the alloy then added to achieve the proper alloy thickness. This procedure is very labor intensive requiring a welder to add a number of weld beads to a small surface, clean the vane, and then add a number of plasma spray layers. In addition, the vane may be damaged due to the thermal stresses involved in the welding operation.

Another problem with the weld/plasma spray process involves the specific area of deterioration. It is to be expected that deterioration will be more severe at the narrowest nozzle dimension where the velocity of the gas flow is highest. During the plasma spray process, alloy is added to the surface in very thin layers, forming a broad even pattern. After completion of the plasma spray, the excess material must be removed from non-eroded areas of the vane. If the deterioration is severe in specific areas, numerous layers of the alloy must be added and much of it removed from the non-eroded areas. Such a procedure is time consuming and wasteful of the ahoy materials involved.

Still another method for refurbishing gas turbine vanes is shown in U.S. Pat. No. 4,726,101 to Draghi et al. In this method, a build up of alloy in the wear area is accomplished by controllably applying layers of a tape of uniform thickness to the vane. The tape includes a mixture of a binder and an alloy powder, which is compatible with the substrate alloy, with the mixture formed into a sheet of uniform thickness and having an adhesive backing. After applying the tape in layers to a desired thickness, the vane is heated to a temperature at which the binder and adhesive decompose and the ahoy in the tape diffusion bonds with the substrate alloy.

Yet another method for refurbishing a gas turbine vane covered by a protective coating is shown in U.S. Pat. No. 5,142,778 to Smolinski et al. In this method, the protective coating is first removed from the surface of the vane. Thereafter, material is added to surfaces of the vane in the areas requiring repair or replacement of the eroded material and bonded to the surfaces. A laser beam is then directed at the surface in the distorted areas such that localized areas of the surface of the distorted areas are melted, solidified, and cooled to ambient temperature to form a recast layer. Any excess material is removed from the surface and the protective coating is reapplied.

The Draghi et al. and Smolinski et al. methods, while effective to refurbish vanes, are complicated to perform. Thus, there remains a need for a simpler approach for restoring a desired flow area of a gas turbine vane, which approach is also cost effective.

DISCLOSURE OF INVENTION

Accordingly, it is an object of the present invention to provide an improved method for refurbishing or restoring a desired flow area on airfoils such as vanes used in gas turbine engines.

It is a further object of the present invention to provide a method as above which is simple to use and cost effective.

Yet other objects of the present invention will become more apparent from the following description and the accompanying drawing(s) wherein like reference numerals depict like elements.

The foregoing objects are realized by the refurbishment or restoration method of the present invention which broadly comprises the steps of: providing a plate to be used to restore a particular flow area to the vane or airfoil; cutting the plate to a desired shape; machining a series of tapers into the cut plate so that the cut plate has a single region with a substantially uniform thickness; and overlaying a surface of the airfoil with the cut and pre-machined plate so that the substantially uniform thickness region is positioned over that portion of the airfoil surface where a particular flow area is required; and attaching the plate to the surface of the airfoil.

The refurbishment or restoration method of the present invention is advantageous in several respects. First, it eliminates the need to do extensive hand-blending after the plate has been affixed to the airfoil surface. Second, the resulting airfoil has a correct flow area as a result of the use of a pre-cut and pre-machined plate that has a precise series of tapers machined therein. Still further, the resultant airloft has a correct shape, as a result of the pre-cut and pre-machined plate, to assure no flow separation will occur and engine performance will not be degraded.

Still other advantages of the refurbishment or restoration method of the present invention will become apparent from the following description and the accompanying drawings.

DETAILED DESCRIPTION OF THE PREFERRED EMBODIMENT(S)

The refurbishment or restoration method of the present invention involves the use of a pre-cut, pre-machined plate 10 to restore a desired flow area on an airfoil such as a gas turbine vane. The plate 10 which is used in the repair method typically will have an initial uniform thickness throughout its area, although plates with non-uniform thicknesses may also be used in the method of the present invention. The plate 10 should be preferably formed from a pre-sintered material such as a two component system material having from about 40% to about 80%, most preferably from about 55% to about 80%, by weight of a nickel-based or a cobalt-based base material and the balance a high melt, high strength braze material. One such system contains 70% of a material designated PWA 36 117-2 and 30% of a material designated PWA 36 117-1. Presintered materials are preferred because they result in a high density material with little shrinkage and a substantially uniform microstructure. Still further, they are not affected by thickness considerations.

Figure 2:
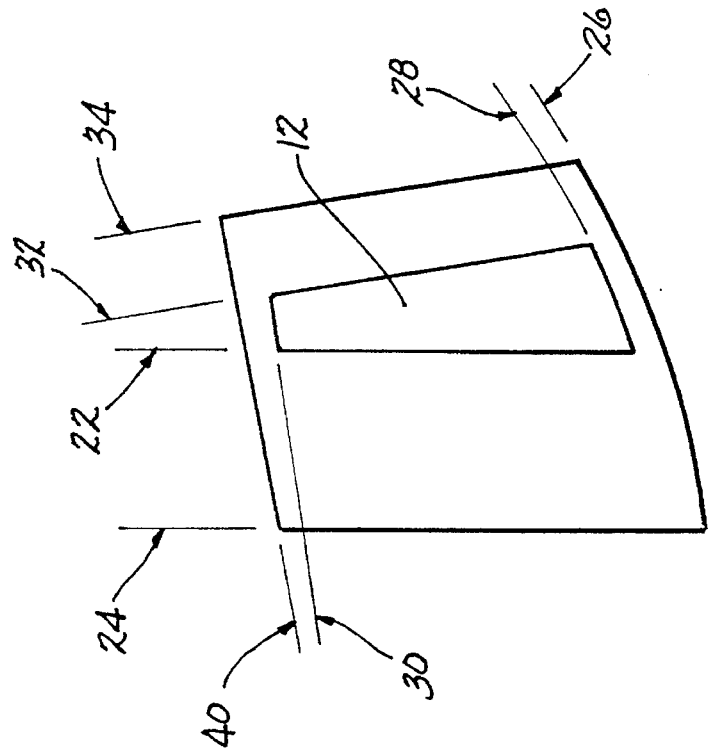
FIG. 1 and FIG. 2 illustrate a pre-cut and pre-shaped plate used in the method of the present invention.
Figure 1:
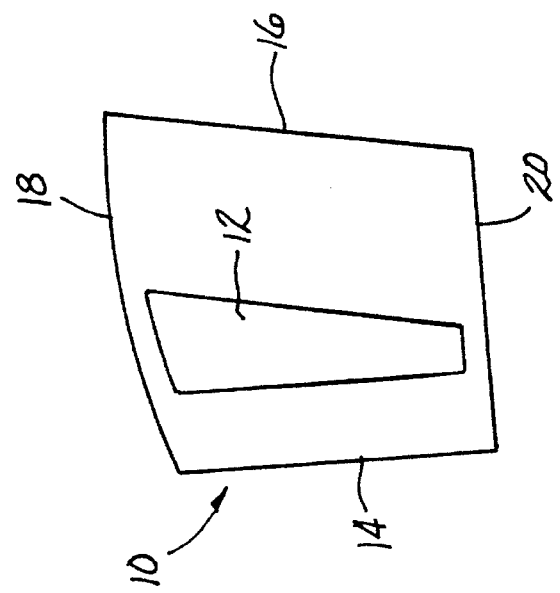
Figure 3:
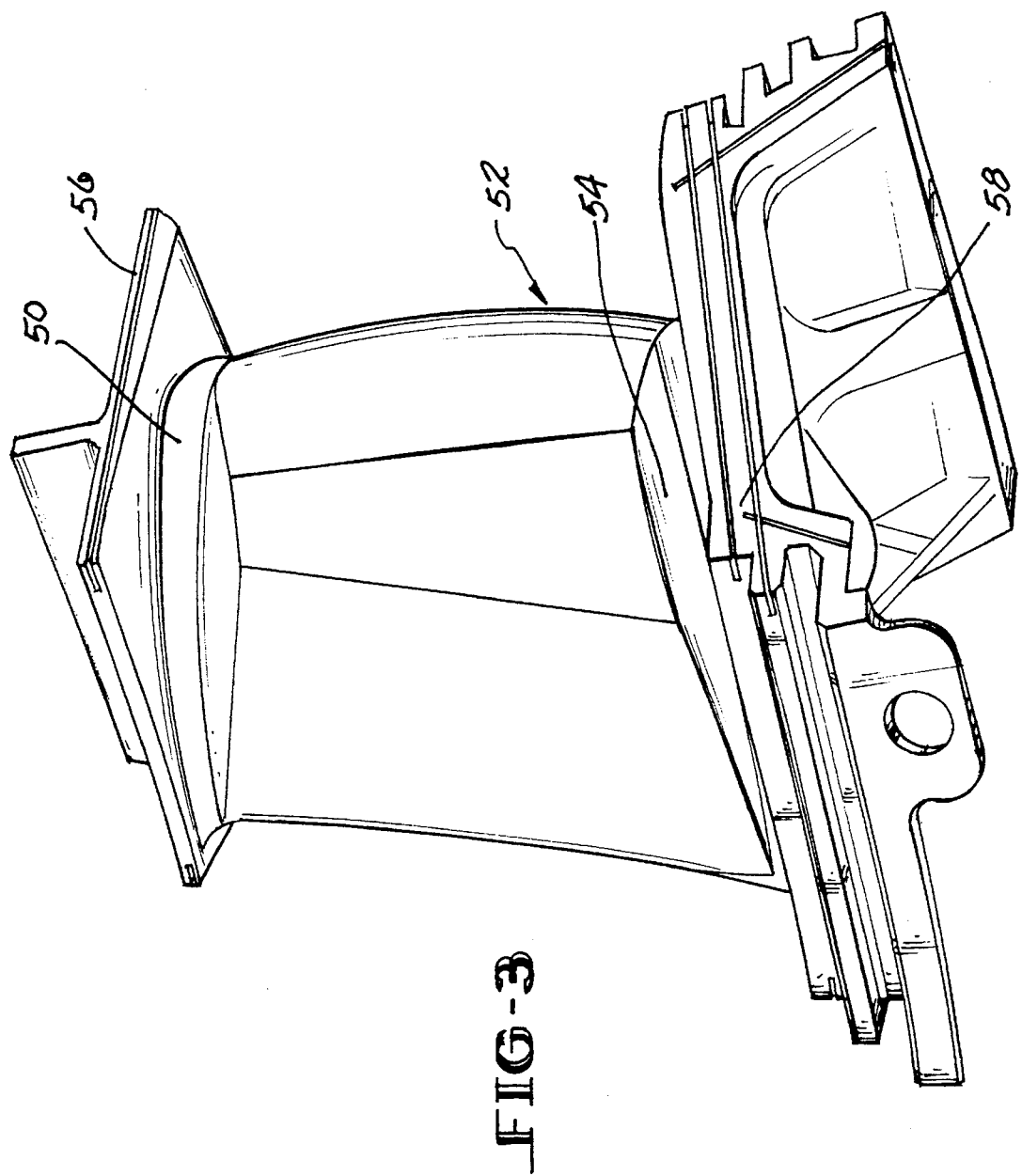
FIG. 3 illustrates the pre-cut and pre-shaped plate placed over an airfoil.

The plate 10 is first cut to a desired shape such as a substantially trapezoidal shape. Where the airfoil is bordered by fillets 50 at inner and outer buttresses, such as the airfoil in FIG. 3, the plate should have a shape which substantially follows the fillets. Thereafter, it is machined to have a single region 12 of substantially uniform thickness and a series of tapers from its leading and trailing edges, 14 and 16 respectively, to the substantially uniform thickness region 12 and a series of tapers from its upper and lower edges 18 and 20, respectively, to the substantially uniform thickness region 12. FIGS. 1 and 2 illustrate a pre-cut, premachined plate in accordance with the present invention.

Typically, the plate 10 will have a thickness in the region 12 of about 0.010" to about 0.060", preferably from about 0.040" to about 0.050". Additionally, the plate typically will have a thickness along its entire perimeter no greater than about 0.005 inches. Of course, the thickness in region 12 will be determined by the particular application for the plate 10. Referring now to FIG. 2, the thickness of the plate 10 may taper linearly from line 22 to line 24 between arcuate lines 26 and 28 and line 30. The thickness of the plate 10 may also taper linearly from line 32 to line 34 between the arcuate line 26 and the line 30. Still further, the thickness may taper linearly between arcuate lines 26 and 28, and between lines 30 and 40. While the present invention has been discussed in the context of using linear tapers between various lines, it should be recognized that different tapering schemes could be used.

The cutting and the machining of the plate 10 may be performed using any suitable method and equipment known in the art.

To refurbish or restore an airfoil, such as an airfoil having an eroded surface, in accordance with the present invention, any protective coating on the airfoil 52 must first be removed. Thereafter, the airfoil 52 is degreased. Any suitable means known in the art such as an alcohol wipe may be used to degrease the airfoil. The surface 54 of the airfoil to be repaired or refurbished is then cleaned. Once again any suitable cleaning technique known in the art, such as a conventional grit blast method using a nickel blast media, may be used.

The bottom surface (the surface of the plate 10 to come in contact with the surface 54) is also cleaned. Cleaning may be performed by repeatedly alternating between ultrasonic cleaning in a mild soap solution and soft bristle brushing with alcohol. After the bottom surface has been cleaned, the trailing edge of the pre-shaped, pre-machined plate 10 is fitted to the contour of the airfoil trailing edge by clamping the plate 10 in position, scribing the trailing edge location onto the plate and then hand blending to a mark about one-sixteenth of an inch in front of the scribe mark. Thereafter, the plate 10 is positioned so that the region 12 is positioned over that portion of the airfoil 52 where a particular flow area needs to be restored. The phrase "restoring a particular flow area to the airfoil" as used herein includes restoring a desired curvature to the surface of the airfoil. The plate is then welded such as by resistance tack welding to the surface 54 at two or more places along the contact surface. Preferably, the tack welds are placed about five-eighths of an inch from the trailing edge of the vane and equally spaced between the buttresses 56 and 58. A small quantity of paste may be placed over the tack welds as a filler and a thin layer of a vacuum stop-off material may be applied to the trailing edge openings as a mask or anti-wetting agent. The stop-off material is a precaution in the event that an unwanted flow of plate material occurs. The stop-off material prevents contact between any material that flows and the trailing edge of the airfoil. Care should be taken that the stop-off material does not contact the plate or the convex surface of the vane. Any suitable stop-off material known in the art may be used.

The airfoff with the plate 10 is then loaded into a furnace or heat chamber preferably with the concave side mating face of the airfoil resting on a tray. In the furnace or heat chamber, the tapered plate is subjected to a heat treatment which softens the plate and conforms it to the shape of the airfoil. The heat treatment which is applied to the tapered plate may be a vacuum thermal cycle operating under the following conditions:

(a) a vacuum leak rate of about 15 microns/hour;
(b) an initial vacuum level of about 0.0005 Torr or lower;
(c) a heat cycle wherein
  (1) the airfoil and plate are heated to about 1000° F. at a rate of about 30° F./minute and held there for about 15 minutes,
  (2) the airfoil and plate are heated to about 1800° F. at a rate of about 25° F./minute and held there for about 15 minutes, and
  (3) the airfoil and plate are heated to about 2200° F. +/− about 15° F. at a rate of about 25° F./minute;
(d) after the temperature in step (3) has been held for about 15 minutes, the main (or diffusion pump) valve is closed while a roughing pump is kept open and a small amount of argon is released into the heating vessel so that the pressure is maintained between about 1.5 and 2.0 Torr;
(e) hold the airfoils and the plates at temperature (about 2200° F.) for up to about 10 hours; and
(f) force argon cooling to below a temperature of about 1200° F. at a rate of about 40° F./minute or faster and continue cooling to below about 300° F. before exposing to air.

If needed, the paste and plate transitions may be hand blended. Thereafter, a protective coating may be applied if desired.

As previously mentioned, because the plate 10 has precise tapers machined beforehand, the resultant airfoil not only has the correct flow area, but also has the correct shape to assure no flow separation will occur and engine performance will not be degraded. Still further, the method of the present invention eliminates the need for extensive hand blending. After the heating step, only minimal hand-blending is required at the extreme edges of the plate. As a result of the need to do only minimal hand-blending, the refurbishment or restoration method of the present invention results in both cost and labor savings. Additionally, the refurbishment or restoration method of the present invention is easier to perform than other prior art methods.

While the present invention has been described in the context of repairing gas turbine vanes, it should be recognized that the method of the present invention may be utilized to repair, restore, or refurbish a surface of any airfoil or hydrofoil.

While the method of the present invention has been described as including cutting, shaping and machining a plate to be fitted over an airfoil, it should be recognized that the method could be performed with a pre-formed, pre-shaped, pre-sintered plate having pre-formed tapers. For example, the plate 10 could be a molded plate having a desired shape and a desired set of tapers.

It is apparent that there has been provided in accordance with this invention a turbine vane flow area restoration method which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

Although this invention has been shown and described with respect to detailed embodiments thereof, it will be understood by those skilled in the art that various changes, omissions and additions in form and detail thereof may be made without departing from the spirit and scope of the claimed invention.

We claim:

1. A method for refurbishing an airfoil to restore a desired flow area, said method comprising the steps of:
providing a plate;
cutting said plate to a desired shape;
machining a series of tapers into said cut plate so that said cut plate has a single central region with a substantially uniform thickness and leading and trailing edges each having a thickness less than said thickness of said central region;
overlaying a surface of said airfoil with said plate so that said substantially uniform thickness region is positioned over that part of the airfoil surface where a particular flow area is required; and
attaching said plate to said airfoil.

2. The method of claim 1 wherein said attaching step comprises heat treating said plate overlaying said airfoil surface so as to cause said plate to soften and conform to the shape of said airfoil surface.

3. The method of claim 2 wherein said attaching step further comprises welding said plate to said airfoil surface prior to said heat treating step.

4. The method of claim 1 wherein said cutting step comprises cutting the perimeter of said plate so as to form a substantially trapezoidally shaped plate.

5. A method for refurbishing an airfoil to restore a desired flow area, said method comprising the steps of:
providing a plate;
cutting said plate to a desired shape;
machining a series of tapers into said cut plate so that said cut plate has a single region with a substantially uniform thickness;
overlaying a surface of said airfoil with said plate so that said substantially uniform thickness region is positioned over that part of the airfoil surface where a particular flow area is required;
attaching said plate to said airfoil;
said airfoil being bounded by two fillets at inner and outer buttresses; and
said cutting step comprising cutting said edges of said plate so that said edges follow said fillets.

6. The method of claim 5 wherein said tapering step comprises tapering said plate to have gradual transitions from said edges abutting said fillets to said substantially uniform thickness area.

7. The method of claim 6 wherein said tapering step further comprises tapering said plate from said substantially uniform thickness region toward the leading and trailing edges of said airfoil.

8. The method of claim 1 wherein said plate providing step comprises providing a plate formed from a pre-sintered material.

9. A method for restoring a flow area on an airfoil comprising the steps of:
placing a pre-cut, pre-machined plate having a single region with a substantially uniform thickness over a surface of an airfoil;
attaching said plate to said airfoil; and
heat treating said airfoil with said attached plate so as to cause said plate to soften and conform to the shape of the airfoil surface.

10. The method of claim 9 wherein said heat treating step comprises:
placing said airfoil and said plate in a heat chamber;

heating the airfoil and said plate in a vacuum atmosphere to a first temperature of about 1000° F. at a rate of 30° F./minute and holding said first temperature for about 15 minutes;

heating the airfoil and said plate in said vacuum atmosphere to a second temperature of about 1800° F. at a rate of 25° F./minute and holding said second temperature for about 15 minutes;

heating the airfoil and said plate in said vacuum atmosphere to a third temperature in the range of about 2185° F. to about 2215° F. at a rate of about 25° F./minute;

introducing an inert gas into said chamber; and holding said third temperature for up to about 10 hours.

11. The method of claim 10 wherein said heat treating step further comprises:

subjecting said airfoil and said plate while in said inert gas atmosphere to a pressure between about 1.5 and 2.0 Torr.

12. The method of claim 10 wherein said heat treating step further comprises:

cooling said airfoil and said plate from said third temperature to a fourth temperature below about 1200° F. at a rate of at least about 40° F./minute.

13. The method of claim 12 wherein said cooling step further comprises:

cooling said airfoil and said plate to a temperature below about 300° F. in said inert gas atmosphere before exposing said airfoil and said plate to air.

14. The method of claim 9 wherein said placing step comprises placing a pre-cut, pre-machined plate formed from a pre-sintered material.

15. A method for restoring an airfoil comprising:

providing an airfoil having an eroded surface;

restoring said eroded surface to an initial configuration so that said surface has a particular flow area; and said restoring step comprising providing a pre-cut, pre-shaped plate having a region with a substantially uniform thickness, positioning said plate on said airfoil surface so that said substantially uniform thickness region overlays that portion of the airfoil surface where said flow area is to be restored, attaching said plate to said airfoil surface, and heat treating said plate and said airfoil to conform said plate to said airfoil surface.

16. The method of claim 1 wherein said machining step further comprises machining said cut plate so that edges of said plate extending between said leading and trailing edges have a thickness less than said thickness of said central region.

* * * * *